UNITED STATES PATENT OFFICE.

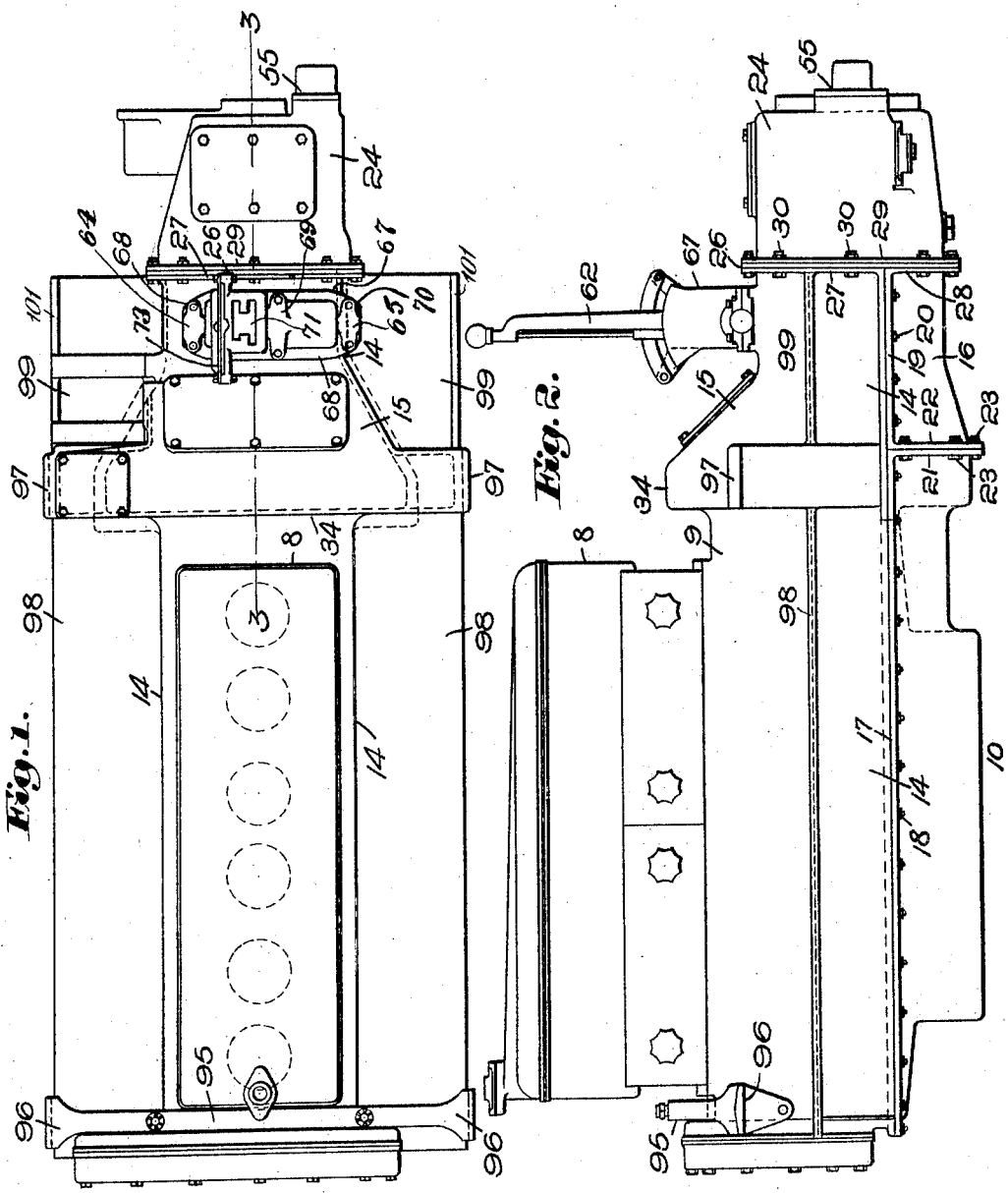

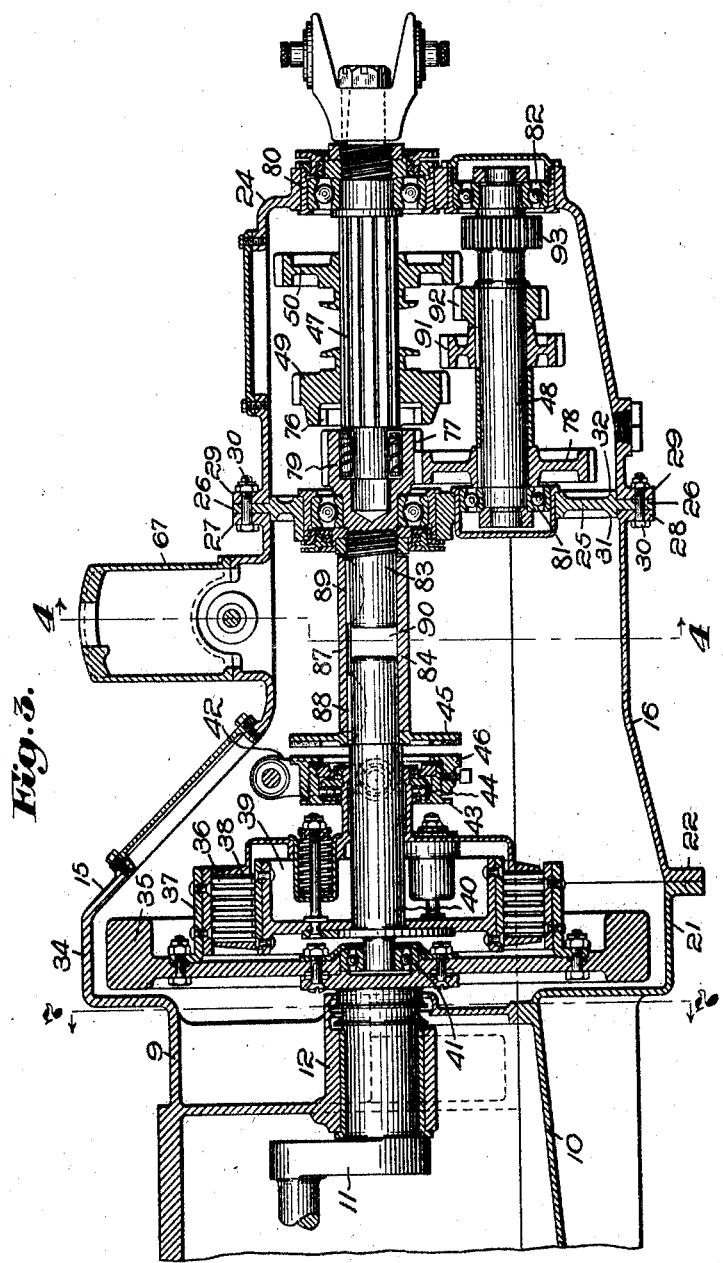

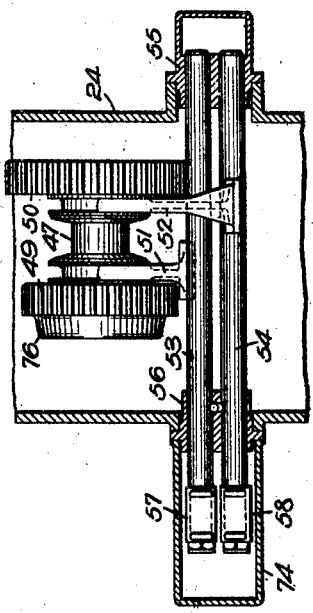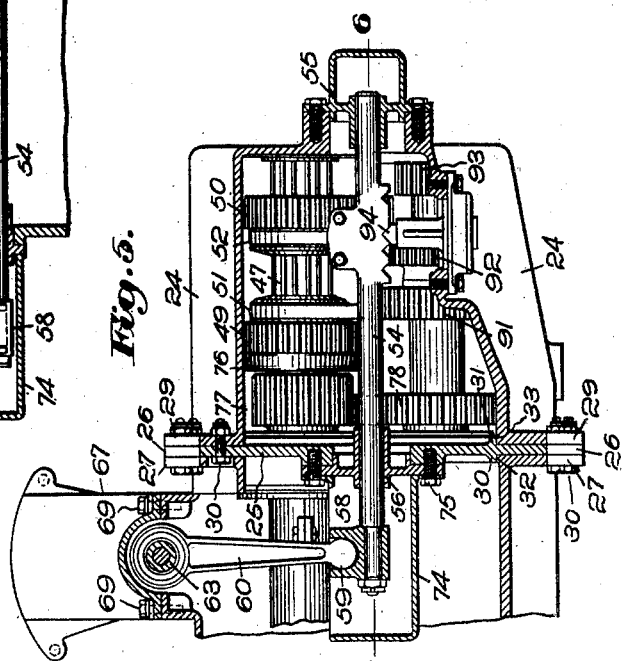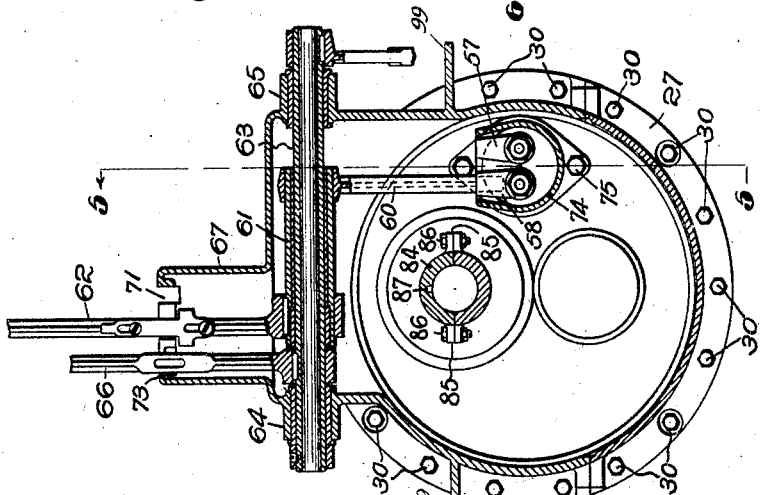

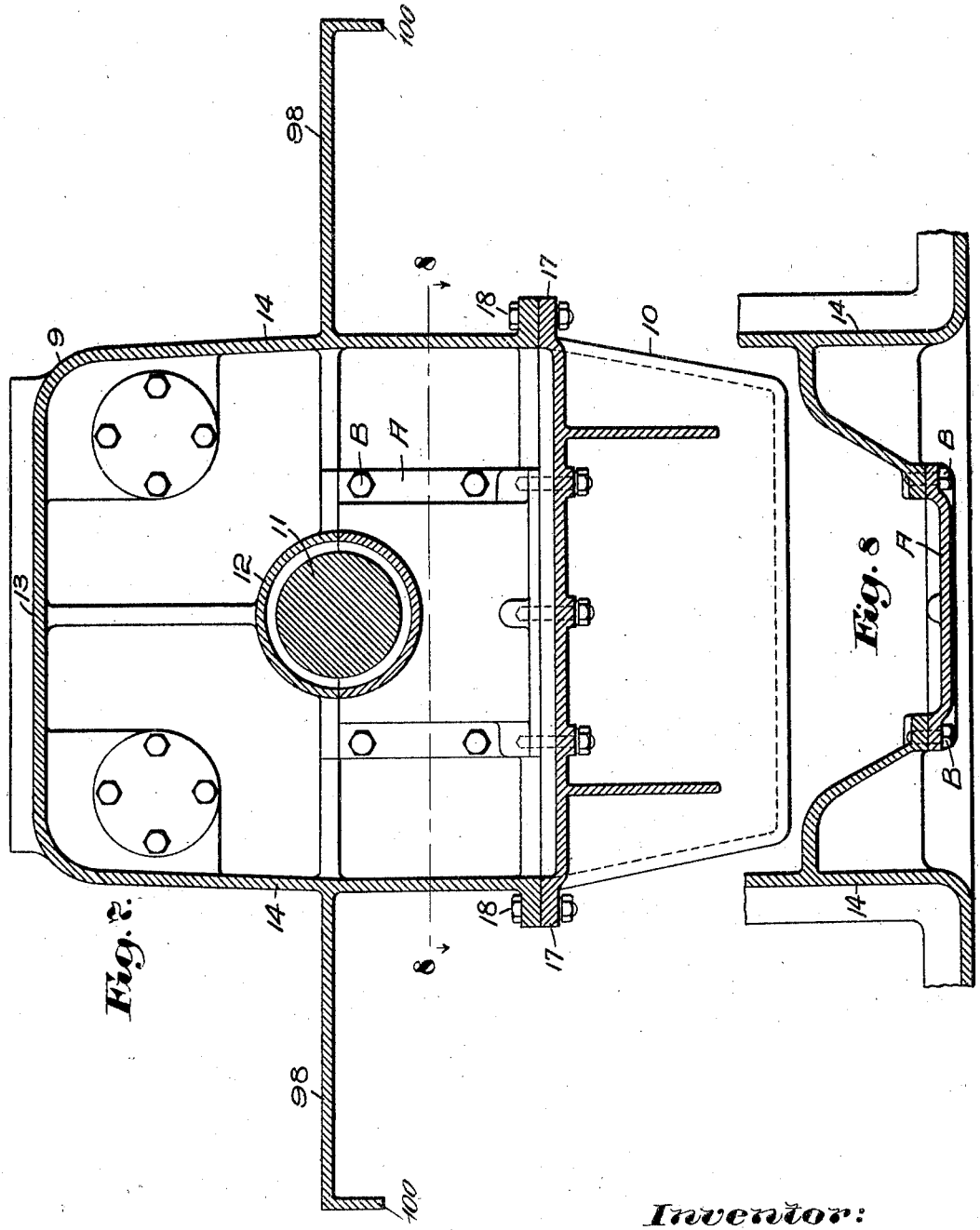

THOMAS L. COWLES, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

POWER PLANT.

1,402,481.   Specification of Letters Patent.   Patented Jan. 3, 1922.

Application filed January 21, 1918. Serial No. 213,084.

*To all whom it may concern:*

Be it known that I, THOMAS L. COWLES, a citizen of the United States, and a resident of Bridgeport, in the county of Fairfield and State of Connecticut, have invented an Improvement in Power Plants, of which the following description, in connection with the accompanying drawings, is a specification, like characters on the drawings representing like parts.

This invention relates to power plants, and is more especially, though not exclusively, concerned with an engine clutch and transmission unit power plant for motor vehicles.

My invention will be best understood by reference to the following description, when taken in connection with the accompanying drawings of one specific embodiment thereof, while its scope will be more particularly pointed out in the appended claims.

In the drawings:

Fig. 1 is a plan of a power plant embodying my invention;

Fig. 2 is a side elevation of the same;

Fig. 3 is a sectional view on an enlarged scale on line 3—3 of Fig. 1;

Fig. 4 is a sectional view on line 4—4 of Fig. 3, looking toward the right;

Fig. 5 is a sectional view on line 5—5 of Fig. 4, looking toward the left;

Fig. 6 is a detail plan section on line 6—6 of Fig. 5;

Fig. 7 is an enlarged sectional view on line 7—7 of Fig. 3, looking toward the left; and Fig. 8 is a sectional view on line 8—8 of Fig. 7.

Referring to the drawings, and to the embodiment of my invention which is illustrated therein, I have shown a unit power plant comprising an engine having a cylinder block 8, mounted on a crank-case comprising an upper part 9 and a lower part 10. Within the crank case is housed a crank-shaft 11, mounted in a plurality of bearings 12 carried by the upper part 9 of the crank-case. The upper part, as best shown in Fig. 7, has a channel-shaped cross-section having a web 13, which constitutes the top, and two depending flanges 14, which constitute the sides. The axis of the crank-shaft 11 is located above the bottom of the flanges 14 (see Fig. 7), and hence the channel member constitutes a deep, rigid girder. The ends of the upper part 9 of the crank-case are provided with removable plates A, secured in place by cap-screws B, which may be removed to permit the removal of the crank-shaft.

The crank-case is prolonged rearwardly to form a clutch housing, comprising an upper part 15 and a lower part 16. The upper part 15 is formed integral with the upper part 9 of the main portion of the crank-case, while the lower part 16 is formed separate from the lower part 10 of the crank-case. In other words, the parts 10 and 16 constitute independent, downwardly-removable under caps, affording access to the interior of the crank-case and the clutch housing. By this means, repairs may be made to the crank-shaft and connecting rod bearings from the under side of the crank-case, by removal of the under cap 10 and the plates A, without disturbing any other part of the power plant. On the other hand, the clutch is rendered accessible for inspection and repair, by the removal of the under cap 16, without disturbing any of the other parts of the power plant.

To this end, the under caps 10 and 16 may be secured in place by any suitable means. In the present example, the under cap 10 is provided with horizontal flanges 17, which are secured to the flanges 14 of the upper part 9 of the crank case by the studs or cap screws 18. Similarly, the under cap 16 is provided with horizontal flanges 19 secured to the flanges 14 by studs or cap screws 20. The under caps 10 and 16 are provided with segmental flanges 21 and 22, respectively, abutting face to face in a vertical plane, and secured together by studs or bolts 23.

Located at the rear of the clutch housing is a transmission housing 24, which may be secured to the clutch housing in any suitable manner. In the present example, I have provided between these housings an intermediate plate 25, provided with a flange 26 located between flanges 27 and 28 on the clutch housing, and a flange 29 on the transmission housing. These flanges are circular in form, and are secured together by bolts 30, some of which pass through and secure all three flanges together, and some of which secure only the flanges 26 and 29 together, as best shown in Fig. 5, by making the flanges 27 and 28 of the clutch housing apertured to receive the heads of the bolts. As a means for making the plate 25 self-centering with relation to the clutch and transmission housings, and to ensure the proper positioning of these housings with relation to each other, I have herein provided said plate with locating means in the form of cylindrical flanges 31 and 32, projecting into and fitting corresponding circular-shaped apertures in the clutch and transmission housings respectively, as best shown in Fig. 3. The plate 25 constitutes a dividing wall between the clutch and transmission housings, and allows the transmission housing to be filled with lubricating oil without danger of the same reaching the clutch. This plate, moreover, constitutes a support for parts of the clutch and transmission.

The clutch housing may be, and preferably is provided with an enlarged, generally cylindrical, portion 34 to receive the usual fly-wheel 35, secured to the rear end of the crank-shaft 11, and this fly-wheel may carry one of the members of any usual or desired type of clutch. In the present example, the illustrated clutch is of the multiple disc type, and comprises one set of discs 36, carried by the clutch member 37 secured to the fly-wheel 35, and another set of discs 38 carried by a clutch member 39, the latter being secured to a clutch shaft 40. This shaft is mounted at its forward end in a usual bearing 41 in the fly-wheel. The rear end is supported in a manner which I will presently describe. The clutch is operated in a usual and well-known manner by a common form of clutch yoke 42, and clutch ring 43, the latter having a usual thrust bearing 44. A usual clutch brake 45, keyed to the shaft 40, cooperates with a disc 46 carried by the clutch ring 43 to stop the rotation of said shaft when the clutch is disengaged.

The transmission may be of any usual or desired type, but in the present example is exemplified by a common form of sliding gear transmission comprising a main shaft 47 and a countershaft 48. Splined on the main shaft 47 are sliding gears 49 and 50 operated by gear-shift forks 51 and 52, respectively, secured to horizontal sliding rods 53 and 54, best shown in Figs. 5 and 6. These rods are herein mounted to slide at their rear ends in a suitable guide 55, at the rear end of the transmission housing 24, and the other ends are mounted to slide in a similar guide 56, secured to the plate 24, as best shown in Figs. 5 and 6.

The gear-shifting rods 53 and 54 preferably extend through the plate 24 into the interior of the clutch housing, and are provided with usual jaws 57 and 58, best shown in Figs. 4 and 6, adapted to receive a rounded terminal portion 59 of a lever 60 secured to and depending from a sleeve 61, to which is also secured an axially-movable, gear-shifting lever 62, best shown in Fig. 4. This sleeve is mounted to slide longitudinally on a rock-shaft 63, which is mounted in suitable bearings 64 and 65 in the clutch housing. This shaft may be the usual shaft employed for the operation of the emergency brake (not shown), and in Fig. 4, I have shown the same provided with a usual hand-operated lever 66.

It should now be evident that by connecting the gear-shifting lever to the sliding rods at a point forward of the transmission, I am enabled to remove the latter without removing said lever, and moreover without disturbing the emergency brake lever. On the other hand, these levers may be removed without disturbing the transmission, since the bearings 64 and 65 are divided, and their upper parts are carried by a removable housing 67, secured to the housing 15 by three sets of cap screws 68, 69 and 70. This housing, as best shown in Fig. 1, is provided with a usual H-slot 71 for the gear-shifting lever 62, and is provided with a segmental slot 73 for the emergency brake lever 66. As a means for catching any oil which might otherwise be carried from the transmission housing into the clutch housings by the action of the sliding rods 53 and 54, I have herein provided an appropriate receptacle 74, best shown in Figs. 5 and 6, secured to the intermediate wall 24 by cap screws 75, which also secure the guide 56 to said wall.

Reverting now to the transmission gears,—carried by and preferably formed integral with the gear 49 is an internal gear 76, best shown in Fig. 3, which constitutes a species of clutch member adapted to receive a cooperating member in the form of a pinion 77, which constantly meshes with a gear 78 secured to the countershaft 48. The driving pinion 77 supports the forward end of the main shaft 47, and to that end is provided internally with a suitable bearing 79, while the rear end of said shaft is mounted in a suitable bearing 80, at the rear end of the transmission housing 24. The forward end of the countershaft 48 is mounted in a suitable bearing 81, supported in the intermediate plate 24, while the rear end of said shaft is mounted in a suitable bearing 82 supported in the rear end of the transmission housing 24. The driving pinion 77 may be connected to the clutch shaft 40 by any suitable means, but in the present example, said pinion is formed integral with a shaft 83, and the latter is coupled to the shaft 40 by a suitable coupling 84. This coupling may take any appropriate form, but in the present example, it is longitudinally divided, and is provided with laterally extending pairs of ears 85 to receive bolts 86 (see Fig. 4), by means of which the two halves of the coupling are secured to each other. As a means for securing the coupling to the shafts 40 and 83, said coupling is herein provided with a key-way 87 to receive keys 88 and 89 secured to the respective shafts, as best shown in Fig. 3. It should here be observed that the adjacent ends of these shafts are separated by a space 90, whose purpose is to allow the clutch shaft to be moved rearwardly a sufficient distance to allow the clutch to be backed out of the fly-wheel. Thus, it is apparent that by simply removing the under cap 16, and then removing the coupling 84, the clutch may be moved, first in a rearward direction, and then in a downward and rearward direction, through the opening provided by the removal of the under cap 16. This is a matter of great practical importance, because it permits the clutch to be removed and replaced very conveniently, without disturbing either the engine, or the transmission or its gear-shifting lever, or any part of the usual body of the car.

Reverting again to the transmission gearing, it should be observed that the driving pinion 77 is always in mesh with the gear 78, secured to the countershaft 48, and therefore the latter is constantly rotating while the engine is running and the clutch is engaged. Secured to the countershaft are two gears 91 and 92, with which the gears 49 and 50, hereinbefore described, are adapted to mesh, though at different times. When the depending arm 60 of the gear-shifting lever 62 is engaged with the jaw 57 of the sliding rod 53, the gear-shifting fork 51, when moved in a rearward direction, will carry the gear 49 into mesh with the gear 91. When this occurs, the main shaft 47 will be driven at a speed determined by the ratio of said gears, and by the ratio of the gear 78 to the pinion 77. When, now, the gear-shifting fork 51 is moved in a forward direction, the gear 49 is unmeshed from the gear 91, and is brought to a neutral position, as shown in Fig. 3. If carried forward beyond this position, the internal gear 76 meshes like a jaw-clutch with the rear end of the pinion 77, and the main shaft 47 is coupled directly with, and driven by, the driving pinion. This is what is commonly called "direct drive." Rearward motion of the gear 76 uncouples the same from the pinion 77, and again brings the gears 76 and 49 to their neutral position shown in Fig. 3; but if, on the other hand, the depending arm 60 is engaged with the jaw 58, and given a forward movement, the rod 54 will cause the gear-shifting fork 52 to carry the gear 50 into mesh with the gear 92. When this occurs, the main shaft 47 will be driven by the countershaft 48 at a speed determined by the ratio of the gears 50 and 92.

Formed on, or secured to, the countershaft 48 is another gear 93, which, in practice, meshes with a reverse pinion (not shown), with which the gear 50 is adapted to mesh when the latter is shifted in a rearward direction from its neutral position shown in Fig. 3. When this occurs, power is transmitted from the countershaft 48 to the main shaft 47, the latter in this case being driven in a reverse direction to back the vehicle. Definite positions of the shifting rods 53 and 54, corresponding to the different positions of the gear-shifting lever, are provided by the use of usual and well-known spring-pressed pins, exemplified by the pin 94 shown in Fig. 5, adapted to enter any one of a series of appropriate notches in the rod. As already stated, the transmission gearing is of common form, and its general mode of operation is too well known to require further description here.

It should now be evident that the transmission, its housing 24, and the intermediate plate 25, may be assembled as a unit, and then applied to the rear end of the clutch housing and secured thereto by the bolts 30. When it is desired to dismount the transmission, this may be accomplished by the removal of the long bolts 30, which fasten the three flanges together, but leaving short bolts in place until later. One factor in the removal of the transmission housing is the coupling 84, it being understood, of course, that the shaft 83 will be detached from the coupling. The coupling may be rendered accessible in either of two ways,—first, by removing the upper housing 6—7, and the parts which it carries, and reaching downward through the aperture thus uncovered, and, second, by removing the under cap 16 and reaching upward through the lower opening into the clutch housing.

Thus it is evident that any of the three units, to wit, the engine, the clutch and the transmission, is rendered quickly accessible for inspection and repair, without the necessity of disturbing either of the remaining units. This is a feature which, so far as I am aware, is absolutely novel, and is a distinct advantage, as will be readily appreciated.

The power plant may be otherwise suitably supported, but in the present example, I have shown its forward end provided with a transverse supporting member 95, having lugs 96 adapted to seat on the vehicle frame, and have provided the enlarged cylindrical portion 34 of the clutch housing 15 with a pair of supporting lugs 97, also adapted to seat on the vehicle frame. Instead of providing any separate under pan, as a protection from mud, water and dust, I prefer to provide the upper member 9 of the crank case with integral, laterally-extending webs 98, forward of the enlarged cylindrical portion 34, and similar webs 99 at the rear thereof. Thus, there is provided a complete protection extending from the front end of the motor to the rear end of the clutch housing, thereby excluding foreign matter, as well as furnishing a very desirable platform on which the various accessories can be mounted. As a means to stiffen the edges of the webs 98, I preferably provide the same with flanges 100 (see Fig. 7), which in the present example are depending. Similarly, the webs 99 are preferably provided with flanges 101 (see Fig. 1), which in the present example are upstanding.

It is now evident that, by the described construction, I have provided a supporting member 9, which constitutes a deep, stiff backbone between the points of support 96 and 97, and that the motor and clutch constitute a unit with no joint between the forward support and the rear end of the clutch housing. It is also evident that all of the vertical joints in the power plant below the axis of the latter are under compression, instead of being under tension. In addition to these advantages, it will be remembered that the crank-shaft, clutch and transmission, are individually and independently accessible, yet without the sacrifice of any strength whatever, but, rather, the result is an actual increase in strength over former constructions.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. In a power plant for motor vehicles, the combination of an engine and a clutch forming a unit having front and rear points of support and a common housing comprising upper and lower parts, said upper part extending integrally from said front support to the rear end of said clutch, and said clutch comprising a power-shaft disposed above the bottom of said upper housing part.

2. A unit power plant comprising, in combination, an engine and a clutch having a one-piece housing member forming the upper part of the engine crank-case and prolonged rearwardly and widened laterally therebeyond below the axis of said engine and clutch.

3. A unit power plant comprising, in combination, an engine having a crank-case comprising an upper part and a lower part, said upper part comprising a one-piece rearwardly elongated clutch and transmission support, a clutch supported by said support, and a transmission having a housing secured to said support.

4. A power plant comprising, in combination, an engine having a crank-case comprising a one-piece rearwardly-elongated, hollow support having a channel-shaped cross-section whose web provides the top and whose flanges provide the sides of the crank-case, a clutch housed between said flanges, and a transmission having a housing secured to said flanges.

5. A power plant comprising, in combination, an engine having a crank-case comprising a one-piece rearwardly elongated hollow support having a channel-shaped cross-section whose web constitutes the top and whose flanges constitute the sides of the crank-case, a crank-shaft whose axis is above the bottom of said flanges, and a clutch housed within said support and having its axis aligned with the axis of said crank-shaft.

6. A power plant comprising, in combination, an engine having a horizontal divided crank-case having upper and lower casing members, a clutch supported by said upper member, a transmission having a casing supported by said upper member, and a clutch under-cap secured to said upper and lower members and to said transmission casing.

7. A power plant comprising, in combination, an engine having a horizontally divided crank-case having upper and lower casing members, a crank-shaft whose axis is above the plane of division of said members, and a clutch supported by the upper casing member.

8. A power plant comprising, in combination, an engine having a crank-case comprising a one-piece hollow support having throughout a part of its length a channel-shaped cross-section whose web constitutes the top and whose flanges constitute the sides of the crank case, said support having a portion which is prolonged beyond said engine and is enlarged above and below the axis of the crank case to constitute a flywheel and clutch housing, and a clutch mounted in said housing.

9. A power plant comprising, in combination, an engine and a clutch having an upper supporting member, and downwardly and independently removable cover means giving independent access to the interior of said engine and clutch from the under side.

10. A power plant comprising, in combination, an engine and a clutch having a housing comprising an upper member, and two lower removable members affording independent access from the under side to the engine and clutch.

11. A power plant comprising, in combination, an engine and a clutch having a housing comprising an upper member provided with supporting means for sustaining said engine and clutch, an under-cap for said engine, and a separate under-cap for said clutch, said under caps being separable from said upper member in a plane below the axis of the crank-shaft and clutch.

12. The combination with a clutch of a housing therefor comprising an upper member provided with supporting means, and a removable under-cap affording access to the interior of said housing without disturbing said upper member, said upper member and under cap being separable in a plane below the axis of said clutch.

13. In a power transmission mechanism, the combination of a clutch, transmission gearing, a gear-shifting lever, and a housing comprising an upper part which supports said clutch, transmission gearing and gear shifting lever, and a lower part removable to afford access to the interior of said housing without disturbing said lever.

14. In a power transmission mechanism, the combination of a clutch, transmission gearing, a coupling between said clutch and transmission gearing, and a housing comprising an upper part which supports said parts, and a lower part which is removable to permit the uncoupling of said clutch and transmission gearing and the removal of said clutch in a downward direction.

15. In a power transmission mechanism, the combination of a clutch, transmission gearing, a divided coupling between said clutch and transmission gearing, and a housing comprising an upper part which supports said parts, and a lower part which is removable to permit the uncoupling of said clutch and transmission gearing and the removal of said clutch in a downward direction.

16. In a power transmission mechanism, the combination of a clutch comprising a shaft, transmission gearing comprising a shaft axially aligned with and separated endwise from said clutch shaft by a space, a coupling connecting said shafts, and a housing comprising an upper part which supports said parts and a lower part which is removable to permit the disconnection of said shafts and the removal of said clutch in a downward direction.

17. In a power transmission apparatus, the combination of a clutch having a housing, a transmission having a housing, and a plate separate from and intermediate said housings and supporting parts of said clutch and transmission.

18. In a power transmission apparatus, the combination of a clutch housing, a transmission housing, a plate separate from and intermediate said housings, a clutch having a shaft supported by said plate, and a transmission having a shaft supported by said plate.

19. In a power transmission apparatus, the combination of a clutch housing, a transmission housing, a plate separate from and intermediate said housings, bearings supported by said plate, and a clutch and transmission having shafts mounted in said bearings.

20. In a power transmission apparatus, the combination of a clutch housing, a transmission housing, a plate separate from and intermediate said housings, a clutch having a shaft supported by said plate, a transmission having a shaft supported by said plate, and a coupling separately uniting said shafts.

21. In a power transmission apparatus, the combination of a clutch housing having an aperture, a transmission housing having an aperture, an intermediate plate having locating means entering said apertures, a clutch housed in said clutch housing, and a transmission housed in said transmission housing.

22. In a power transmission apparatus, the combination of a clutch housing having a circular aperture, a transmission housing having a circular aperture, an intermediate plate having centering projections fitting said apertures, a clutch housed in said clutch housing, and a transmission housed in said transmission housing.

23. In a power transmission apparatus, the combination of a clutch housing having a flange, a transmission housing having a flange, a plate intermediate said flanges, means to secure said flanges together, a clutch in said clutch housing, and a transmission in said transmission housing.

24. In a power transmission apparatus, the combination of a clutch housing having an aperture and a flange about said aperture, a transmission housing having an aperture and a flange about such aperture, an intermediate plate having locating means entering said apertures and having a flange intermediate said housing flanges, means to secure all of said flanges, a clutch in said clutch housing, and a transmission in said transmission housing.

25. In a power transmission apparatus, the combination of transmission gearing, a housing therefor, a clutch disposed forward of said transmission gearing, a clutch housing supporting said transmission housing, and a gear-shifting lever connected to said gearing and disposed forward of the transmission housing.

26. In a power transmission apparatus, the combination of transmission gearing, a housing therefor, a clutch disposed forward of said transmission gearing, a clutch housing supporting said transmission housing, and a gear-shifting lever connected to said gearing and mounted independently of the housing thereof.

27. In a power transmission apparatus, the combination of transmission gearing, a housing therefor, a clutch disposed forward of said transmission gearing, a housing for said clutch, and a gear-shifting lever connected to said gearing, and mounted on said clutch housing.

28. In a power transmission apparatus, the combination of transmission gearing, a housing therefor, a clutch disposed forward of said transmission gearing, a housing for said clutch, and a gear-shifting lever extending into said clutch housing and connected with said gearing.

29. In a power transmission apparatus, the combination of transmission gearing, a housing therefor, a clutch disposed forward of said transmission gearing, a housing for said clutch, gear-shifting rods extending from said transmission housing into said clutch housing, and a gear shifting lever cooperating with said rods within said clutch housing.

30. In a power plant, the combination of an engine and a clutch having a common housing provided with laterally projecting webs forming a pan extending from the front end of said engine to the rear end of said clutch.

31. In a power plant, the combination of an engine and a clutch having a common housing divided in a horizontal plane and provided above said plane with laterally projecting webs forming a pan extending from a point adjacent the front end of said engine to a point adjacent the rear end of said clutch.

32. A power plant comprising, in combination, an engine having a crank-case comprising a one piece rearwardly elongated hollow support having a channel-shaped cross-section whose web constitutes the top and whose sides constitute the sides of the crank-case and clutch-case, a crank-shaft whose axis is above the bottom of said flanges, and a clutch housed within said clutch-case and having its axis above the bottom of the flanges of said clutch-case.

33. A unit power plant comprising, in combination, an engine and clutch having in common a one-piece, upper housing part providing an engine support and a clutch support, a lower casing part for said engine, a lower casing part for said clutch, said lower casing parts having abutting faces in a vertical plane, and means to draw said faces together.

34. A unit power plant comprising, in combination, an engine and clutch having in common a one-piece, upper housing part providing an engine support and a clutch support, a lower casing part for said engine, a lower casing part for said clutch, said lower casing parts having abutting faces in a vertical plane, and horizontally disposed bolts connecting said lower casing parts.

35. A unit power plant comprising, in combination, an engine and clutch having in common a one-piece, upper housing part providing an engine support and a clutch support, a lower casing part for said engine, a lower casing part for said clutch, said lower casing parts being provided with flanges having faces abutting in a vertical plane, and means connecting said flanges together.

36. A unit power plant comprising, in combination, an engine and clutch having in common a one-piece, upper housing part providing an engine support and a clutch support, lower casing parts for said engine and clutch, and means providing for the removal of either lower casing part without disturbing the other.

37. A unit power plant comprising, in combination, an engine and clutch having in common a one-piece, upper housing part providing an engine support and a clutch support, lower casing parts for said engine and clutch, and means providing for the removal of the lower casing part of said engine without disturbing the lower casing part of said clutch.

38. A unit power plant comprising, in combination, an engine and clutch having in common a one-piece, upper housing part providing an engine support and a clutch-support, a power-transmitting mechanism having a housing supported by said part, a lower housing part for said engine, and a lower housing part for said clutch, the last-mentioned housing part being in compression between said power-transmitting mechanism housing and said engine lower housing part.

39. A unit power-plant, comprising, in combination, an engine and clutch having in common a one-piece, upper housing part providing an engine support and a clutch support, a power-transmitting mechanism having a housing supported by said part, a lower housing part for said engine, and a lower housing part for said clutch, the last-mentioned housing part having vertical-jointed connection with said power-transmitting housing part and said engine lower housing part.

40. In a power transmission mechanism, the combination of a clutch comprising a shaft, transmission gearing comprising a shaft coaxially aligned with said clutch shaft and separably coupled therewith, and a housing comprising an upper part which supports said parts and a lower part which is removable to permit the uncoupling of said shafts and the removal of said clutch in a downward direction.

41. In a power transmission apparatus, the combination of a clutch having a housing, and a transmission having a housing separately united with said clutch housing and provided with a wall interposed between the interiors of said housings and providing a support for the transmission mechanism.

42. In a power transmission apparatus, the combination of a clutch housing, a transmission housing separably united with said clutch housing and carrying a wall forming a partition between said housings, a clutch housed in said clutch housing, and a transmission housed in said transmission housing and having a shaft supported by said wall.

43. In a power transmission apparatus, the combination of a clutch housing, a transmission housing separably united with said clutch housing and carrying a wall therebetween, bearings supported by said wall, and a clutch and transmission having shafts mounted in said bearings.

44. In a power transmission apparatus, the combination of a clutch housing, a transmission housing separably united with said clutch housing and carrying a wall therebetween, a clutch having a shaft supported by said wall, and a transmission having a shaft supported by said wall and coupled to said clutch-shaft.

45. In a power transmission apparatus, the combination of a clutch housing having an aperture, a transmission housing provided with a wall extending across said aperture, and provided with locating means entering said aperture, a clutch housed in said clutch housing and a transmission housed in said transmission housing.

46. In a power transmission apparatus, the combination of a clutch housing having a circular aperture, a transmission housing having a wall intervening between the interiors of said housings and provided with centering means fitting said aperature, a clutch housed in said clutch housing, and a transmission housed in said transmission housing.

47. In a power transmission apparatus, the combination of a clutch housing having a flange, a transmission housing having a flange and carrying a wall forming a partition between said housings, means to secure said flanges together, a clutch in said clutch housing, and a transmission in said transmission housing.

48. In a power plant, the combination of an engine and a clutch having a housing provided with laterally projecting webs on opposite sides of said clutch and extending generally parallel with the axis thereof.

49. In a power plant, the combination of an engine and a clutch having a housing provided with laterally extending webs extending from a point adjacent the rear end of said clutch toward the forward end of said engine.

50. In a power transmission apparatus, the combination of a clutch, and a clutch housing provided with laterally projecting webs extending from a point adjacent the rear end thereof to a point adjacent the front end thereof.

51. In a power plant, the combination of an engine and a clutch having a housing provided with laterally projecting webs on opposite sides of said clutch, said webs being provided with longitudinal flanges.

52. In a power plant, the combination of an engine and a clutch having a housing provided with laterally projecting webs on opposite sides of said clutch, said webs being provided with upstanding longitudinal flanges.

53. In a power plant, the combination of an engine and a clutch having a housing provided with laterally extending webs extending from a point adjacent the rear end of said clutch toward the forward end of said engine, said webs being provided with longitudinal flanges.

54. In a power plant, the combination of an engine and a clutch having a housing provided with an enlargement for the engine fly-wheel, and provided with laterally projecting webs along the sides of said engine and clutch in front of and at the rear of said enlargement.

55. In a power plant, the combination of an engine and a clutch having a housing provided with an enlargement for the engine fly-wheel, and provided with laterally projecting webs along the sides of said engine and clutch in front of and at the rear of said enlargement, said webs being provided with longitudinal flanges.

56. In a power plant, the combination of an engine and a clutch having a housing provided with an enlargement for the engine fly-wheel, and provided with laterally projecting webs along the sides of said engine and clutch in front of and at the rear of said enlargement, said webs being provided with longitudinal flanges, the flanges in front of said enlargement depending from their webs, and the flanges at the rear of said enlargement upstanding from their webs.

57. In a power transmission apparatus, the combination of a clutch having a housing provided with an end opening, a transmission having a separate housing provided with an end wall closing said opening and removable with said transmission housing from said clutch housing, and means detachably to secure said transmission housing and end wall to said clutch housing.

58. In a power transmission apparatus, the combination of a clutch having a housing provided with an end opening, a transmission having a separate housing provided with an end wall closing said opening and removable with said transmission housing from said clutch housing, and means detachably to secure said end wall to said transmission housing.

59. In a power transmission apparatus, the combination of a clutch having a housing provided with an end opening, a transmission having a separate housing provided with an end wall closing said opening and removable with said transmission housing from said clutch housing, bolts detachably to secure said transmission housing and end wall to said clutch housing, and bolts detachably to secure said end wall to said transmission housing.

60. In a power transmission apparatus, the combination of a clutch having a housing provided with an end opening, and a transmission having a separate housing provided with an end wall closing said opening and removable with said transmission housing from said clutch housing, said housings being provided with locating means to ensure their proper registration when assembled.

61. In a power transmission apparatus, the combination of a clutch having a housing provided with an end opening, and a transmission having a separate housing provided with an end wall closing said opening and removable with said transmission housing from said clutch housing, said end wall and said transmission housing being provided with locating means to ensure their proper registration when assembled.

62. A unit power plant comprising, in combination, an engine, a clutch having a shaft, and a transmission having a gear directly carried by said shaft, means to secure said shaft to said gear, and housing means provided with an opening for the downward removal of said clutch without disturbing said transmission.

63. A unit power plant comprising, in combination, an engine, a clutch having a shaft, and a transmission having a gear directly carried by said shaft, means to secure said shaft to said gear, and housing means providing for the downward removal of said clutch without disturbing said transmission, said means including an under-cap beneath said clutch.

64. A motor car power transmission apparatus comprising, in combination, a clutch having a housing and a rotatable member therein, a transmission having a housing and a rotatable member therein, said clutch housing having an opening for the downward removal of the first-mentioned member, and coupling means connecting adjacent ends of said members and having provision to permit the first-mentioned member to be displaced laterally with relation to the second-mentioned member for removal through said opening.

65. A unit power plant comprising, in combination, an engine, a clutch and a transmission, having housing means providing for the downward removal of said clutch without disturbing said transmission, a longitudinally divided coupling connecting said clutch and transmission, and an under-cap beneath said clutch.

66. A unit power plant comprising, in combination, an engine, a clutch and a transmission, having housing means provided with an opening for the downward removal of said clutch without disturbing said transmission, said clutch including a two-part shaft, a coupling connecting the parts of said shaft, and two bearings only, supporting said shaft.

67. In a power transmission mechanism, the combination of a clutch including a two-part shaft having a coupling connecting the two parts of the shaft, and two bearings only, supporting said shaft at opposite sides respectively of said coupling.

68. In a power transmission mechanism, the combination of a clutch including a two part shaft having a longitudinally divided coupling connecting the two parts of the shaft, and two bearings only, supporting said shaft at opposite sides respectively of said coupling.

69. In a power transmission mechanism for a motor car, the combination of a clutch and a transmission, said clutch comprising a shaft and said transmission comprising a gear axially aligned with and driven by said shaft, and means providing for the downward removal of said clutch without disturbing said transmission, said means including a detachable connection between said shaft and said gear and a housing provided in its under side with an opening affording access to said connection to permit the same to be disconnected and reconnected by reaching upward from beneath, the dimensions of said opening being such as to permit said clutch when thus disconnected to be removed in a downward direction through said opening.

70. In a power transmission apparatus for a motor car, the combination of housing means presenting an opening in the under side thereof, three axially alined shafts housed therein, and means affording driving connections between said shafts and having provision for the downward removal of the intermediate shaft from its driving connection with said other shafts and through said opening without disturbing such other shafts.

In testimony whereof, I have signed my name to this specification.

THOMAS L. COWLES.